United States Patent [19]

O'Neill et al.

[11] 4,219,755
[45] Aug. 26, 1980

[54] ELECTROMOTIVE ACTUATOR

[75] Inventors: Cormac G. O'Neill, Lafayette; Charles E. Foster, Fremont, both of Calif.

[73] Assignee: Physics International Company, San Leandro, Calif.

[21] Appl. No.: 778,861

[22] Filed: Mar. 18, 1977

[51] Int. Cl.$^2$ ............................................. H01L 41/10
[52] U.S. Cl. .................................................. 310/348
[58] Field of Search ........................................ 310/328

[56]  References Cited
U.S. PATENT DOCUMENTS

| | | | |
|---|---|---|---|
| 3,377,489 | 4/1968 | Brisbane | 310/328 |
| 3,390,559 | 7/1968 | Steutzer | 310/328 X |
| 3,684,904 | 8/1972 | Galutva et al. | 310/328 |

Primary Examiner—Mark O. Budd
Attorney, Agent, or Firm—Robert R. Tipton

[57]  ABSTRACT

An electromotive actuator comprises a hollow cylinder within which is an electroexpansive body having attached to each end a metal cup with slotted sides. Inside of each cup there is positioned an electroexpansive disc which, in the absence of excitation, causes the slotted sides, which are called fingers hereinafter, to bend outward, and in the presence of excitation enables them to return to their original position. In the absence of excitation the fingers clamp tightly against the inner surface of the cylinder and in the presence of excitation they spring inwardly and release that surface. By sequencing the excitation of the respective discs and the central body in one embodiment of the invention, the assembly can be made to move in either direction and thereby move an externally extending rod. In another embodiment of the invention, by properly sequencing the excitation of the discs and central body, high torque and fine angular resolution may be obtained.

21 Claims, 8 Drawing Figures

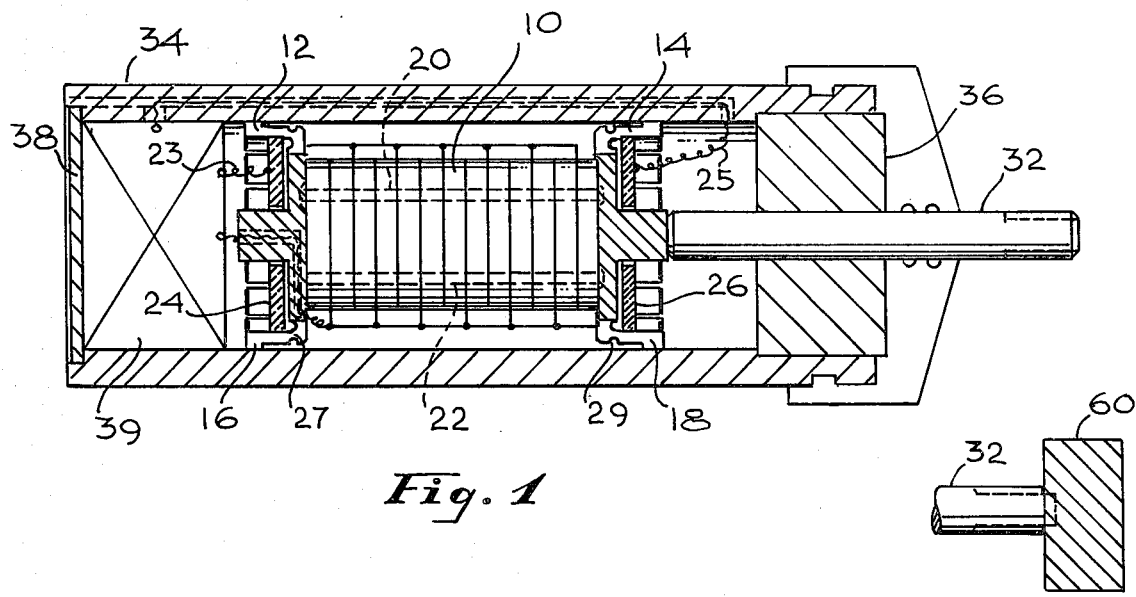
*Fig. 1*
*Fig. 3*
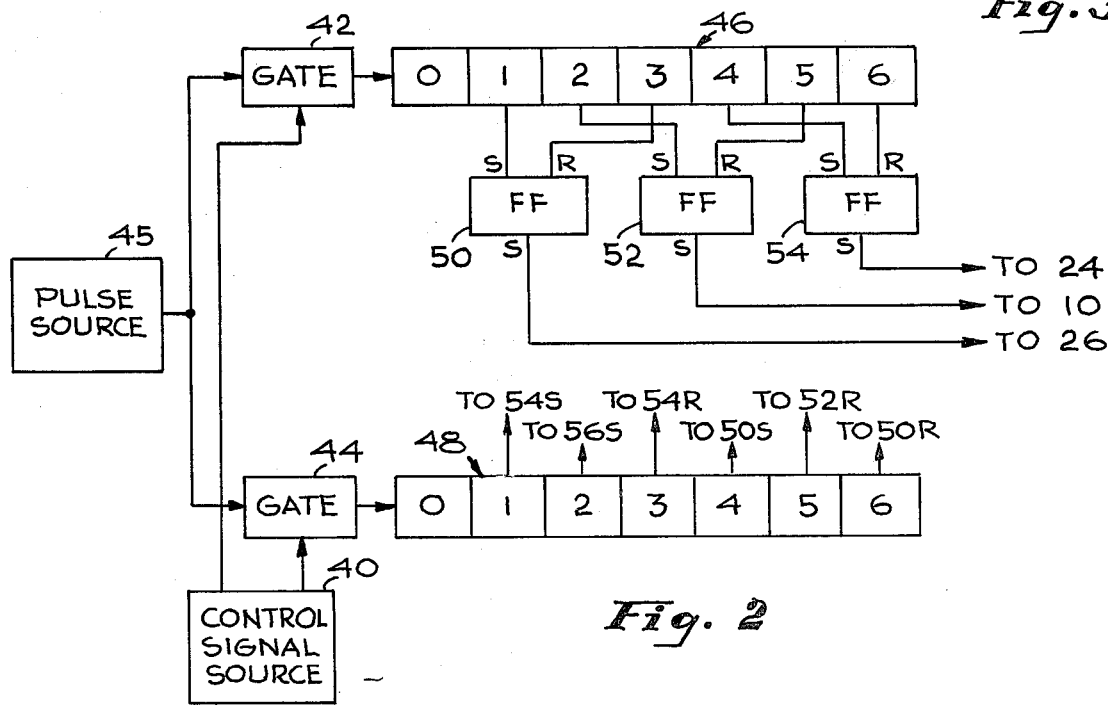
*Fig. 2*
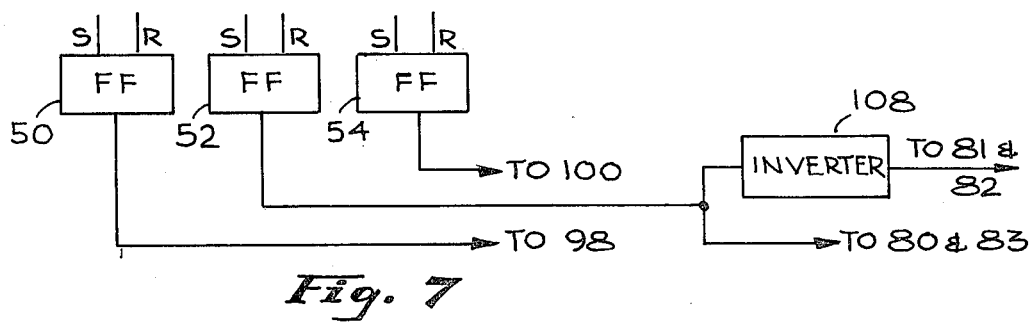
*Fig. 7*

ELECTROMOTIVE ACTUATOR

BACKGROUND OF THE INVENTION

This invention relates to electromotive motor structures and more particularly to improvements therein.

Piezoelectric motors or actuators of the type wherein PZ discs or PZ tubes interact with steel rods or tubes for the purpose of converting electrical signals into linear motion have a number of practical disadvantages. The fit of a disc with a tube or cylinder is subject to very close machining tolerances. The effect of differential thermal expansion and temperature differentials between the cylinder and the PZ material with which it interacts limit the ambient temperatures over which the unit may be operated to a narrow range. The PZ material will scrub heavily against the outer housing and thus will rapidly deteriorate.

Electromechanical actuators employing magnetic elements in the form of solenoids are unable to respond to proportionate signals and are either "full travel" or zero travel devices. If their programmed displacement is resisted, current in the coil windings increases and there is a danger of overheating with consequent coil failures.

Electromechanical actuators of the magnetic "torque motor" pattern can respond proportionately but their force capability is greatly limited and their displacement is heavily influenced by applied load. Electrorestrictive actuators can respond to proportionate signals and develop high force, but their displacement is very small and may be coupled only with the greatest difficulty and close tolerance machining.

PZ actuators have high force capability, proportional displacements, rapid response and high stiffness (insensitivity to applied load) but their small displacement usually demands some form of mechanical or hydraulic motion amplifier.

OBJECTS AND SUMMARY OF THE INVENTION

An object of this invention is to provide an electromotive actuator which avoids the requirement of very close machining tolerances and the mechanical scrubbing problems previously indicated.

Yet another object of the invention is to provide an electromotive actuator including an improved mechanical motion amplifier.

Another object of the invention is to provide a precise high torque rotary actuator.

Still another object of this invention is to provide a novel and simple electromotive actuator.

The foregoing and other objects of this invention may be achieved by providing a central electroexpansive body which can be piezoelectric, magneto strictive, electrostrictive or even magnetically actuated. This body has a cup attached to each end with the sides slotted to provide a plurality of fingers. The material of the cups is a resilient metal. For example, when a disc of PZ material is subjected to an axial electric field applied by connecting a potential source across its two flat faces, it expands in the direction of field application and contracts along planes normal to the axis. The amount of radial contraction is determined by the product of the electric field and the $d_{31}$ coefficient as described in, for example, W. P. Mason "Piezoelectric Crystals and their Application to Ultrasonics." A disc of an electromotive material, such as PZ, is fitted inside each cup, which is dimensioned so that when the disc is excited by a proper electric field, it can fit within the cup without difficulty. When the field is removed, the disc expands radially and thus the fingers in each cup are expanded outwardly. The discs in each cup are excited and the assembly is then fitted inside of a cylinder. A rod is attached to at least one end of the assembly and extends axially outwardly from the cylinder.

When the exciting fields are removed from the discs, the fingers of the two cups expand outwardly and firmly grasp the walls of the cylinder and hold the assembly in place. The fingers of the respective cups constitute motion amplifiers. The assembly can be moved by first exciting one of the discs whereby the associated fingers move away from the walls of the cylinder. The central body is then excited thereby expanding axially to move the cup with the excited disc therewith. At that time the excitation is removed from the excited disc whereby its fingers will engage the cylinder walls. The disc in the cup at the other end of the central body is then excited, followed by removal of excitation from the central body. The central body then contracts moving the cup with the excited disc therewith. The excitation is then removed from the excited disc. In this manner the assembly, including the rod extending externally from the cylinder can be made to move from one end of the cylinder to the other.

In a practical embodiment of the invention, the rod may be tapered and by its position within an orifice, as determined by controlling the assembly, it can control the amount of fluid which passes through that orifice such as fuel being supplied to an engine.

If it is desired to hold the assembly stationary and move the cylinder, then all that is required is that the rod be held stationary. Then, to move the cylinder in a direction away from the clamped side of the assembly, the disc in the cup at the end of the assembly closest to the clamped side is excited, followed by an excitation of the central body. This moves the cylinder. The excited disc then has the excitation removed whereby it clamps the cylinder wall. The other disc is then excited followed by removal of the excitation of the central body, followed by removal of the excitation of the other disc. The system is then ready for a new cycle. To move in the opposite direction, the sequence is reversed.

To obtain angular movement with high torque the cups and associated discs have their position maintained but four stacks of discs are provided with their axes at right angles to the cylinder axis. The four stacks are arranged in a square and are held between extensions from the cups in a manner so that when a diagonally opposite pair of the stacks is excited with one polarity voltage and the diagonally opposite pair is excited with an opposite polarity voltage a twisting motion occurs which turns whichever one of the cups has its fingers released at that time. Excitation of the excited disc is removed. The other disc is excited. The excitation to the stacks of discs is then removed, followed by removal of excitation from the other disc whereby the assembly is held at its new angle.

BRIEF DESCRIPTION OF THE DRAWINGS

FIG. 1 is a cross-sectional view of an actuator in accordance with this invention.

FIG. 2 is a block schematic drawing exemplifying an electrical circuit which can be used to actuate the embodiment of the invention shown in FIG. 1.

FIG. 3 is a fragmentary view illustrating another embodiment of the invention.

FIG. 7 is a schematic drawing of circuits supplemental to the circuits shown in FIG. 2 for driving the invention shown in FIG. 6.

DESCRIPTION OF THE PREFERRED EMBODIMENTS

Figure 2A:
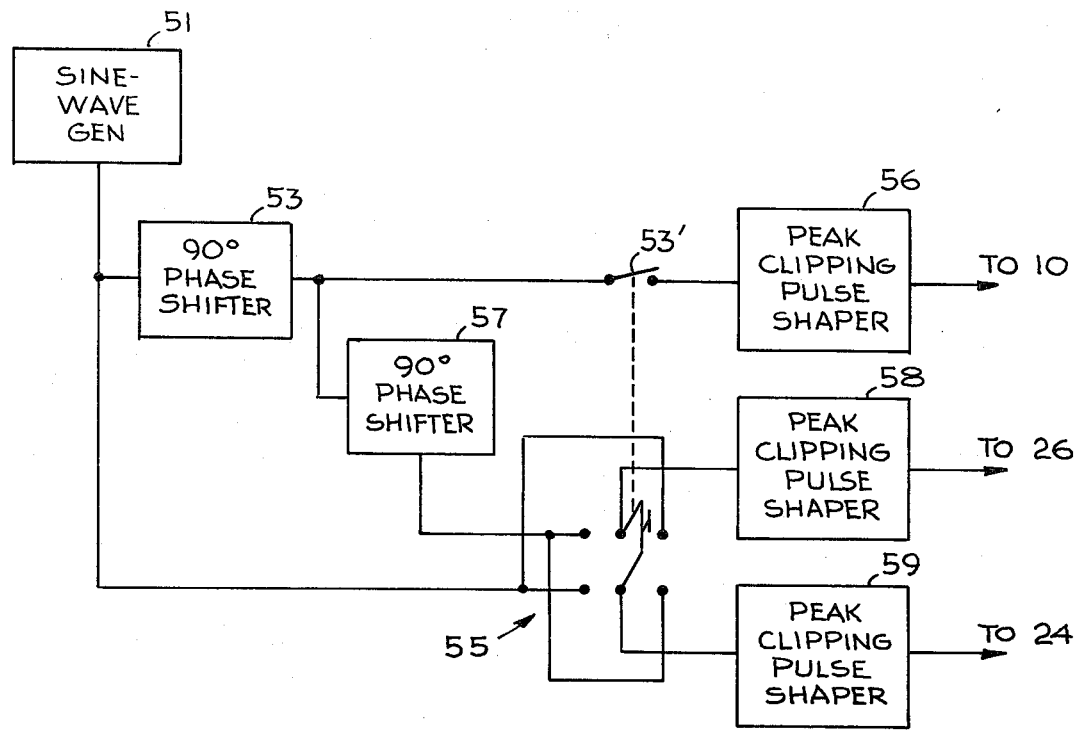
FIG. 2A is a block schematic drawing of an alternative circuit for actuating the embodiment of the invention.

Referring now to FIG. 1, there may be seen a cross sectional view of one embodiment of the invention. This comprises a central body 10 which, by way of example but not by way of a limitation on the invention is a stack of PZ discs. A metal cup respectively 12, 14 is attached to each end of the PZ stack. The sides of each cup are cut or slotted to provide metal fingers which for cup 12 bear reference numeral 16 and for cup 14 bear reference numeral 18. The stack of electroexpansive discs 10 is maintained in compression by tension wires or rods, represented by the dotted lines, respectively 20, 22, which also hold the two cups tightly clamped against the stack. An exciting voltage is applied to the stackin well known manner, by wiring 11.

The cups are made of a resilient metal having a low thermal expansion such as "Invar." Inserted into each cup is a disc, respectively 24, 25. These discs by way of example, and not to serve as a limitation on the invention may be PZ material.

It is known that the PZ discs may have an electric field applied thereacross as by leads respectively 23, 25, which causes axially expansion and radial contraction. The disc sizes are selected so that when an electric field is applied thereacross, they can fit inside of the cups and when the field is removed, they expand radially and cause the fingers of the cups to spring outwardly. Acordingly, the discs 24, 25 are excited and placed within the respective cups, 12, 14.

The term 'excitation' and 'excited,' as used in this specification, refers to the application of the constant or modulated direct current electric field across the PZ discs that causes their controlled expansion and contraction in accordance with the magnitude of that field.

To achieve motion amplification, the outer periphery of each cup has a larger diameter at the tips of the fingers which is ground to make even contact with the bore of the cylinder. At the base of each finger a circumferential groove 27, 29 is cut in the cup to provide, in effect, a mechanical hinge. The electroexpanisve disc is positioned axially inside the cup, such that its radial displacement is amplified at the tips of the fingers, the mechanical hinge acting as a fulcrum.

A rod 32, is attached to one end of the assembly. The discs 24, 26 are excited to enable the radial cup fingers to retract and the assembly is then inserted within a cylinder 34. The inner diameter of the cylinder is selected so that when excitation is removed, from the respective discs 24, 26 the cup fingers extend outwardly and tightly engage the inner walls of the cylinder. A plug 36, having an opening to enable the rod 32 to extend therethrough may close one end of the cylinder. A cover 38 may be used to close the other end of the cylinder.

The wire leads for applying excitation may be brought outside of the cylinder through suitable openings or the electronic circuits 39 required for sequencing and exciting the discs and stack may be enclosed at one end of the leads connected thereto.

In order to cause the assembly to move in either direction within the cylinder, the three elements of the actuator are operated sequentially by a circuit arrangement such as is shown in FIG. 2. To make the assembly move in the direction of the rod 32, for example, excitation is applied to the disc 26, which causes the radial cup fingers to retract inwardly away from the cylinder wall. Grooves 27, 29 in the outer periphery of the cups 12, 14, reduce the bending stiffness of the fingers and act as a mechanical hinge. As a result, a mechanical amplification occurs to increase the radial displacement of the finger diameter by a factor determined by the length of the cup fingers. After disc 26 has been excited, the stack 10 is excited causing it to expand axially. This moves the cup 14 and the rod 32 to the right.

Thereafter, excitation is removed from the disc 26 whereupon the radial fingers 18 spring outwardly and engage the inner wall of the cylinder 34. Thereafter, disc 24 is excited causing the radial fingers 16 to spring inwardly away from the inner wall of the cylinder. This is followed by a removal of the excitation from the stack 10 whereupon the stack contracts moving the left end of the assembly towards the right. This is followed by the removal of excitation from the disc 24, enabling it to expand and cause the radial fingers 16 to engage the inner wall of the cylinder. To cause opposite motion of the assembly and rod, the procedure described is reversed.

A schematic of a digital electrical circuit which may be used to sequence the system to provide motion either to the left or the right is shown in FIG. 2. A control signal source 40 can enable either one of two gates respectively 42, 44, to pass signals from a pulse source 45, through gate 42 to a cyclic counter 46, or through gate 44 to a cyclic counter 48. When gate 42 is enabled, the cyclic counter 46 can control three flip flops, respectively 50, 52, 54 to sequence the respective discs 26, 24 and the stack 10 to move the assembly to the right, or in the direction of the rod. When the gate 44 is enabled, the counter 48, can sequence the respective flip flops 50, 52 and 54, to sequence the two discs and the stack so that the assembly will move to the left.

In operation, assume that the control signal source 40 enables gate 42 to apply pulses to counter 46. In response to the first pulse, the counter will move from its 0 state to its one count state, which sets flip flop 50. When in its set state, the output of flip flop 50 can enable a field to be applied to the disc 26. This causes the disc to contract radially whereupon the fingers of the cup 14 spring inwardly. The second count of the counter sets the flip flop 52, whereby a field is applied in response to the output of flip flop 52 to the stack 10. The stack expands in an axial direction. The next or third count of counter 46 resets flip flop 50 whereupon the field is removed from the disc 26 and the radial fingers spring out outwardly engaging the inner wall of the cylinder 34. The fourth count of the counter 46 sets the flip flop 54, in response to which the disc 24 contracts radially enabling the cup fingers to spring inwardly. The fifth count of the counter 46 resets flip flop 52 whereupon the excitation field is removed from the stack 10 causing it to contract and move the cup 12 therewith. The sixth count of the counter resets the flip flop 54, removing the excitation from the disc 24, whereupon the cup fingers are caused to bend radially outward and engage the inner wall of the cylinder. The next count of the counter sets it on the 0 count.

When gate 44 is enabled, the first count of the counter sets flip flop 54. The second count of the counter sets flip flop 52. The third count of the counter resets flip flop 54. The fourth count of the counter resets flip flop 52. And the sixth count of the counter resets flip flop 50. This causes the assembly to move to the left.

If it is desired to move the cylinder which encloses the assembly and maintain the actuator assembly fixed, all that is required is to hold the assembly stationary and properly sequence the excitation of the two discs and the stack.

FIG. 2A is a block schematic diagram of an alternative circuit for actuating the discs and the stack in the proper sequence to obtain motion in either direction. The sine wave output of a sine wave generator 51 is applied to a 90° phase shifter 53 and to a double pole double throw switch 55. The output of the 90° phase shifter 53 is applied through a switch 53' to a peak clipper pulse shaper 56 and to a second 90° phase shifter 57. The output of the second phase shifter is also connected to double pole double throw switch 55.

The double pole double throw switch output is connected to two peak clipper and pulse shaper circuits respectively 58 and 69. The connections from the sine wave generator 51 and 90° phase shifter to the double pole double throw switch 55, and from the double pole double throw switch to the respective peak clippers 58 and 59 are made in known fashion so that, when operated to one closed position, the output of 90° phase shifter 56 is connected to peak clipper and pulse shifter 58, and the output of the sinewave generator 51 is applied to peak clipper and pulse shaper 59, and when operated to its other closed position peak clipper and pulse shaper 58 receives the output of sine wave generator 51 and peak clipper and pulse shaper 50 receives the output of the sinewave generator. Every time the double pole, double throw switch is operated to a closed position, it closes switch 53', otherwise switch 53' remains open.

Peak clipping pulse shaper 56 has its output applied through suitable amplification means, not shown to the electromotive body 10; peak dipping and pulse shapers 58 and 59 respectively have their outputs applied through suitable amplification means not shown to respective discs 26 and 24. The circuit of peak clippers and pulse shapers 58 and 59 are arranged to and shape a little more than 90° of the tops of the sinewaves that they receive. The circuit of peak clipper and pulse shaper 56 is arranged to clip and shape a little more than 180° from the top of the sinewave it receives. Accordingly, when double pole double throw switch 55 connects sinewave generator output to peak clipper and pulse shaper 59 and 90° phase shifter 57 to peak clipper and pulse shaper 58, then, the following takes place.

First, disc 24 is excited, followed approximately 90° later by excitation of the stack of discs 10. A little more than 90° later excitation is removed from disc 24. Before the stack of discs 10 have their excitation removed, and about 90° after they were excited, disc 26 is excited. After excitation, is removed form the stack of discs, it is removed from disc 10. Accordingly, the excitation sequence enables motion of the assembly in the direction of disc 26. By operating double pole double throw switch to its other position the assembly motion will be made in the direction of disc 24.

From the foregoing it should be appreciated that the output of peak clipper and pulse shaper 56 and of flip flop 52 perform the same function. The outputs of peak clipper and pulse shapers 58 and 59 respectively perform the same functions as the respective outputs of flip flops 50 and 54.

FIG. 3 shows the rod 32 being held stationary by a block 60. The remainder of the embodiment of the invention is exactly as is shown in FIG. 1, and therefore will not be repeated here. Thus, FIG. 3 is a fragmentary view of another embodiment of the invention. The circuit required for moving the cylinder 34, is the same circuit as is shown in FIG. 2, as will become clear from the following description. Assume that it is desired to move the cylinder to the left. Gate 42 is enabled. When counter 46 assumes its first count state, it sets flip flop 50 whereupon the disc 26 has excitation applied to it and the radial fingers of the cup 14 spring inwardly away from the cylinder walls. When counter 46 attains its second count, it sets flip flop 52 which applies an excitation to the stack 10 causing it to expand axially which, because the assembly is held stationary, moves the cylinder 34 to the left the same distance as the distance of the expansion as the stack 10. This third count of the counter 46 resets flip flop 50. The radial fingers of cup 14 now engage the cylinder walls. The fourth count of the counter sets flip flops 54 in response to which excitation is applied to the disc 24 whereupon the radial fingers of the cup 12 spring inwardly. A fifth count of the counter resets flip flop 52, in response to which the excitation field is removed from the stack 10 in response to which it contracts radially, carrying the cup 12 with it. Upon the sixth count, the flip flop 54 is reset removing the excitation from the disc 24 whereupon the radial fingers of the cup 12 are caused to expand outwardly, engaging the wall of the cylinder 44.

To reverse the motion of the cylinder 34, gate 44 is enabled to pass pulses from the pulse source 46 to counter 88. The first count sets flip flop 54 in response to which disc 24 is excited and the radial fingers of cup 12 spring outwardly. The second count of counter 48 sets flip flop 52, in response to which stack 10 is excited, causing it to expand radially and carry the cup 12 with it.

The third count of counter 48 resets the flip flop 54 whereupon excitation is removed from disc 24 and the radial fingers of the cup 12 engage the inner walls of the cylinder again. The fourth count of the counter sets flip flop 50, in response to which the disc 26 is excited and the radial fingers of cup 14 spring inwardly away from the cylinder wall. The fifth count of the counter reset flip flop 52, whereupon the stack 10 contracts radially. Since the stack position is fixed, when it contracts, it moves the cup 12 to the right along with it whereby moving the cylinder to the right. When counter 48 attains its sixth count, it resets flip flop 50 wherby the field is removed from the disc 26 and the fingers of the cup 14 are moved outwardly to engage the cylinder walls again.

The above pattern of voltage application may be repeated at frequencies up to 1000 Hz. The result is a slewing of the inner assembly of the actuator that transmits a force through the rod 32. The rod force depends upon the force capability of the electroxpansive device 10 and the friction force applied by the cups 12 and 14 through their fingers 16 and 18 to the inner walls of the cylinder 34. The cups and the cylinder may be fabricated from a low thermal expansion material, such as Invar, to avoid differential expansion.

From the description of FIG. 2A, it should be clear that that circuit provides the sequence of operation required for moving the cylinder as described above.

Figure 4:
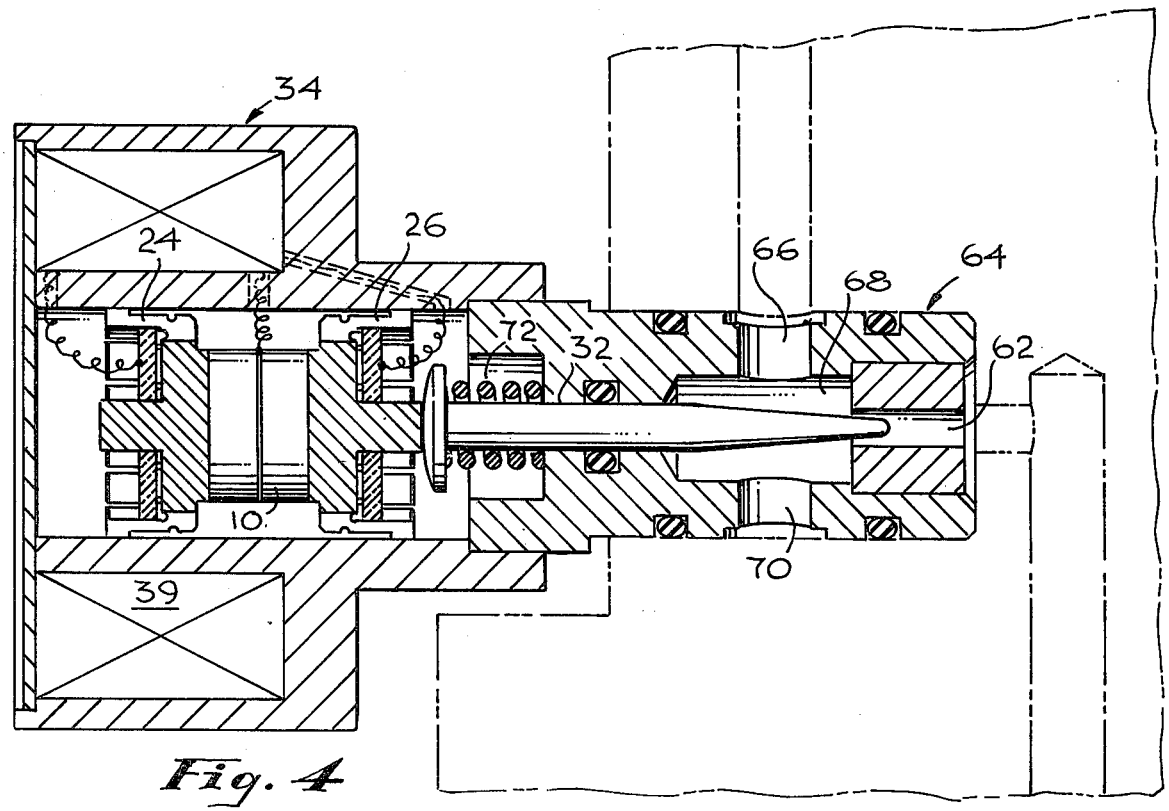
FIG. 4 is illustrative of an actual application of an embodiment of the invention.

FIG. 4 illustrates in cross section a practical embodiment of the invention used, for example, to control fuel flow. Components in FIG. 4 which are the same or similar to those shown in FIG. 1 are given the same reference numerals. The shaft 32 has its end gradually reduced to a point so that as the actuator moves to the right, as seen in the drawing, the shaft 32 will gradually reduce the size of the passageway 62 in the housing 64. Fuel, or a liquid, from a source, not shown, flows through opening 66 and opening 70 in the housing 64 to fill the cavity 58, in the housing, which connects to the passageway 62.

The spring 72 assists in motion that opens passageway 63. Operation of the system should be clear from the explanation of FIGS. 1 and 2. The apparatus shown may be used as an idle fuel trimmer in an internal combustion engine.

Figure 5:
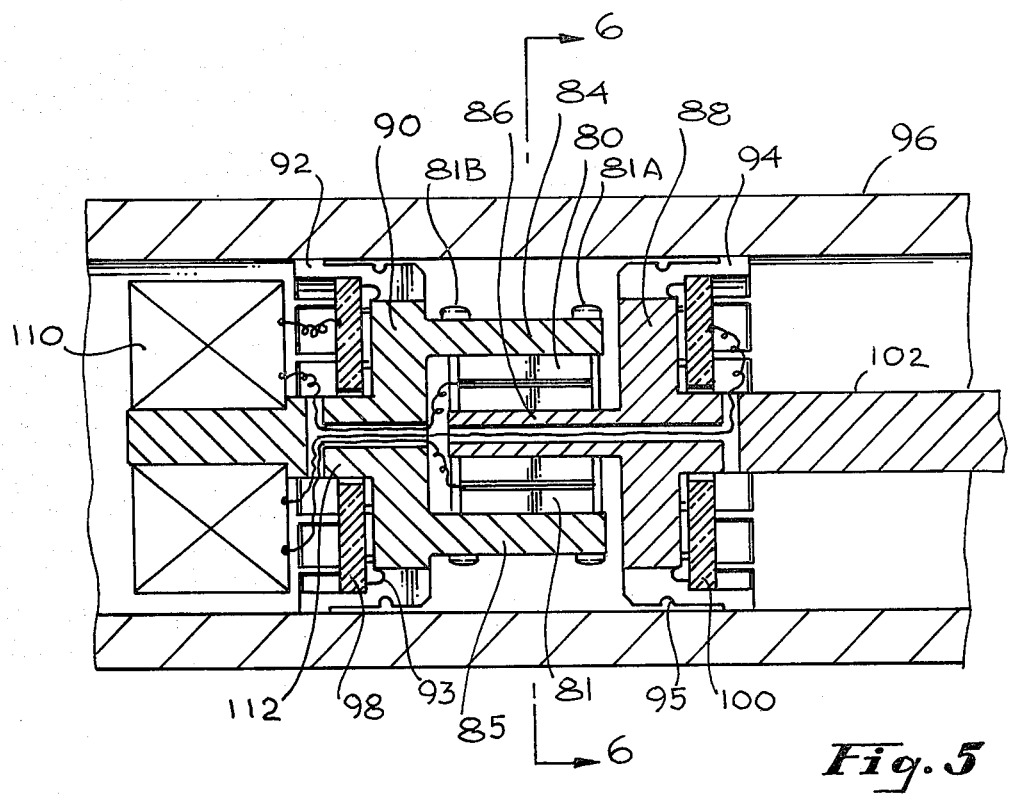
FIG. 5 is a cross sectional view of an embodiment of the invention which produces torque or a turning action.
Figure 6:
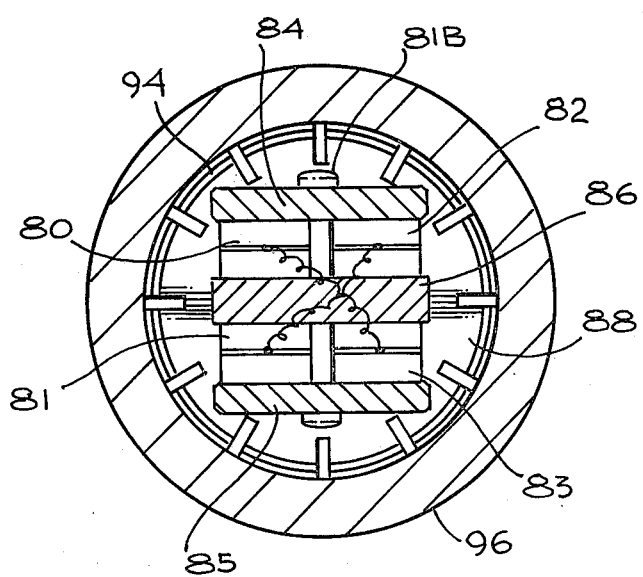
FIG. 6 is a view along the lines 6—6 in FIG. 5.

Reference is now made to FIGS. 5 and 6 which are respectively a cross sectional view and a view along lines 6—6 illustrating a "rotating" embodiment of the invention. Four stacks of discs, respectively 80, 81 and 82, 83 are clamped by bolts 81A, 81B between them, in side by side relationship between a fork extension 84, 85 attached to cup 90 and a blade extension 86 attached to cup 88. However, they are positioned with their axes at an angle to the axis of cylinder 96. The cup members have fingers respectively 92, 94 created by slotting the sides of the cup, have the external bottom notches, respectively 92, 95, and, as before, the cups are dimensioned to fit within the cylinder 96, when the respective discs 98, 100 within the respective cups have a voltage applied across them. A shaft 102 extends outwardly of the cylinder from the base of cup member 88.

The sequence of excitation is generally as was previously described. First the disc in one cup is excited to enable release of the fingers of that cup, followed by excitation of the central disc stacks, followed by release of excitation of the disc in said one cup, followed by excitation of the disc in the second cup releasing its fingers, followed by release of excitation of the central disc stacks, followed by release of excitation of the disc in the second cup.

Excitation of the one diagonally related pair of the central stacks, say stacks 80 to 83 causes an expansion of those stacks. Excitation of the other pair of stacks 81 and 82 may be effected with a negative voltage to cause contraction of a similar magnitude. Or a voltage of similar polarity may be applied to their stacks if they are initially "poled" in opposite sense to the other stacks. Since the outer ends of all stacks are effectively held motionless by the fork extension from the cup 90 whose fingers are still in holding contact with the inside wall of the cylinder, a twisting movement of the other blade extension 86 and therewith the associated cup 88 can occur. Upon removal of the excitation from the disc in this cup, its fingers engage the cylinder wall again, holding its new position. The disc in the other cup is excited, releasing its fingers from the wall. The excitation is them removed from the central stacks, the four stacks of disc return to their unexcited positions twisting the other released cup therewith. Excitation is re- moved from the other cup, and the electromotive assembly is now in the new position, rotated by an angle from the former position.

If one side is always excited first, then the direction of rotation is determined by the voltage polarity applied to each of the two stack pairs. If one pair of stacks is always to be excited in the same polarity then the direction of rotation is determined by which of the discs is excited first.

Connection is made to the discs by means of slip rings, not shown, which can be attached to and rotate with cup 90. The electronic logic and power supply 110 is carried on an extension from cup 90 and also rotates with it.

By displacing the two pairs of stacks 80,81 and 82,83 axially from one another and reducing their distance from the cylinder axis, greater angular steps, but less torque is obtained.

By holding one cup so it cannot rotate as described in connection with FIG. 3, the cylinder may be made to turn instead of the rod. If for example, rod 112, extending from cup 90, is fixed and the electronic logic and power supply are similarly fixed requiring no slip rings, then cylinder 96 can be made to rotate in one or the other direction by causing expansion of one or the other of the diagonally related pairs of stacks with contraction of the remaining diagonally related pairs.

The same circuitry operated in the same manner as was described for FIGS. 2 and 2A may be used to drive the embodiment shown in FIG. 5 except with the modification shown in FIG. 7. There flip flops 50, 52 and 54 are shown, which are sequenced in the manner previously described for FIG. 2. The output of flip flop 50, when set, applies a field to disc 98. The output of flip flop 56, when set, applies a field to disc 100. The output of flip flop 54, when set, is applied to stacks 80 and 83 and to an inverter 108 which applies the inverted polarity voltage to stacks 81 and 82. In the case of FIG. 2A, the output of peak clipper and pulse shaper 56 would be used to drive the inverter 108 as well as stacks 80 and 83.

There has accordingly been described hereinabove a novel and useful actuator which can provide precise and rapid linear motion or rotary motion.

We claim:
1. An electromotive actuator comprising
a hollow housing having internal walls,
electromotive means within said container comprising electroexpansive body means for increasing its axial dimension in response to an electric field applied thereacross,
releasable holding means attached to each end of said electroexpansive body means for holding it within said housing so that its axial expansion results in a displacement relative to said housing,
each of said releasable holding means including electroexpansive disc means for contracting radially when excited, and
means defining an expandable cup in which said electroexpansive disc means is positioned and adapted to engage the inner peripheral surface thereof, with the exterior peripheral surface of said cup adapted to engage said internal walls when said electroexpansive disc means is not excited and to not engage said internal walls when said electroexpansive disc means is excited, and
means for sequentially exciting and removing excitation from one of said electroexpansive disc means, said electroexpansive body means and then the other of said electroexpansive disc means to cause relative motion of said electromotive means and said hollow housing.

2. An electromotive actuator as recited in claim 1 wherein each said expandable cup has slotted sides forming fingers which extend outwardly to engage said internal walls when said electroexpansive disc means is not excited and to retract when it is excited, and a groove formed on the outside periphery of said expandable cup means and at the base of said fingers to afford flexibility and to enable radial motion amplification by said fingers in response to radial motion of the electroexpansive disc adjacent thereto.

3. An electromotive actuator as recited in claim 1 wherein said expandable cup has slotted sides forming fingers which extend outwardly to engage said internal walls when said electroexpansive disc means is not excited and which are retracted when said electroexpansive disc means is excited, and said electroexpansive body comprises a stack of electroexpansive disc means.

4. An electroexpansive actuator as recited in claim 1 wherein said expandable cup has slotted side forming fingers which extend outwardly to engage said internal walls when said electroexpansive disc means is not excited and which retract when said electroexpansive disc means is excited, and said electroexpansive body comprises two pairs of stacks of electroexpansive disc means held with one pair opposite the other pair between said cup means whereby rotary between said cups is achieved.

5. An electromotive actuator comprising:

a hollow cylinder having internal walls, electromotive means within said hollow cylinder comprising a pair of axially aligned cup means spaced apart from one another, said cup means axis being substantially aligned with said cylinder axis, each said cup means having notched sidewalls to create bendable fingers and having a holding member extending away from the base of said cup means toward the other cup means, parallel to and spaced from the axis of said container and spaced from the other holding member, and two pairs of stacks of electroexpansive discs held in opposing relationship between said holding members, an electroexpansive disc means positioned in each of said cup means for bending said fingers outwardly to engage said internal walls when not excited by an electric field and to enable said fingers to bend inwardly away from said internal walls when excited, and means to sequentially excite said electroexpansive disc means and said two pairs of stacks of discs to cause an angular displacement of said electroexpansive actuator relative to said container.

6. An electromotive actuator as recited in claim 5 wherein each said cup means has slotted sides forming fingers which extend outwardly to engage said internal walls when said electroexpansive disc means is not excited and to expand when it is excited, and a groove formed on the outside periphery of said cup means and at the base of said fingers to afford flexibility and to enable motion amplification by said fingers in response to motion of the electroexpansive disc adjacent thereto.

7. An electromotive actuator as recited in claim 5 wherein said electroexpansive disc means and said two pairs of stacks of electroexpansive discs are made of piezoelectric material.

8. An electromotive actuator as recited in claim 5 wherein each said cup means is made of Invar metal.

9. An electromotive actuator as recited in claim 5 wherein there is included a rod extending from said container, said rod also being attached to said electromotive means to move therewith.

10. An electromotive actuator as recited in claim 5 wherein there is included means for preventing motion of said electromotive means whereby said container rotates when said assembly is excited by said means for sequentially exciting.

11. An electromotive actuator as recited in claim 5 wherein the holding member of one said cup means comprises a pair of spaced apart flat extensions, extending from the cup means base substantially parallel to the axis of said hollow cylinder toward said other cup means base, the holding member of the other said cup means comprises a flat extension extending between said pair of spaced apart flat extensions, one pair of said two pairs of stacks being held between one surface of said flat extension and one of said two pairs of flat extensions, the other of said two pairs of stacks being held between the surface of said flat extension opposite to said one surface and the other of said two pairs of flat extensions.

12. An electromotive actuator as recited in claim 10 wherein said means to sequentially excite said electroexpansive disc means and said two pairs of stacks of discs includes, means for exciting two relatively diagonally positioned stacks, one in each pair to cause them to expand axially, and the remaining two stacks to cause them to contract axially.

13. An electroexpansive actuator comprising:

a hollow container having internal walls, electromotive means within said hollow container comprising:

electroexpansive body means for increasing its axial dimension in response to an electric field applied thereacross, means attached to each end of said electroexpansive means for positioning it within said housing so that its axial expansion in response to the application of an electric field takes place substantially along the axis of said cylinder, each of said means at the end of said electroexpansive body comprising a cup having spaced notches cut in the side walls thereof to create a plurality of fingers and a groove formed at the base of said fingers at the outside periphery of each said cup, each said cup being made of a resilient material whereby said fingers may be bent outwardly from a position substantially at right angles to the base of the cup in response to the application of pressure thereto, each said cup having a size whereby it can fit within said hollow cylinder when the fingers are in their relaxed position and when pressure is applied to said fingers to cause them to extend away from their relaxed position to engage the internal walls of said cylinder, electroexpansive disc means positioned within a cup for altering its dimensions radially in response to the application of an electric field, said electroexpansive disc means being sized so that when in its radially expanded state it presses the fingers of the cup outwardly to engage the walls of said cylinder and when in its radially contracted state it enables the fingers to return to a position at which they do not engage the walls of said cylinder, and means for sequentially applying and removing electric fields from one of said electroexpansive disc means, said electroexpansive body means, and the other of said electroexpansive disc means for causing said electromotive means and said cylinder to move relative to one another.

14. The system as recited in claim 13 wherein each said electroexpansive disc means is made of PZ material and said electroexpansive body means is a stack of PZ discs.

15. Apparatus as recited in claim 13 wherein each said cup and said hollow container are made of "Invar" metal.

16. Apparatus as recited in claim 13 wherein a rod is attached to said assembly which is movable therewith and extends from said cylinder.

17. Apparatus as recited in claim 13 wherein there is included means for preventing motion of said electromotive means whereby said cylinder moves when said assembly is excited by said means for applying excitation.

18. A system as recited in claim 13 wherein a rod is attached to said assembly to be movable therewith, said rod extending out of said cylinder and having a tapered end, a fuel passageway into which said rod tapered end extends, the amount of fuel being able to pass through said passageway being determined by the amount by which said rod tapered end extends into said passageway.

19. An electromotive actuator comprising means defining a hollow container having internal walls, an electromotive member disposed within said container comprising an electroexpansive member adapted to increase its axial dimension in response to an electric field applied thereacross, a pair of releasable holding members each attached to each end of said electroexpansive member and adapted to hold said electroexpansive member within said housing so that the axial expansion of said electroexpansive member results in a displacement relative to said housing, each of said releasable holding members comprising an electroexpansive disc member adapted to expand radially in response to an electric field applied thereacross, means, adapted to engage the internal wall of said container, for amplifying the radial expansion of said electroexpansive disc, and means for sequentially exciting and removing excitation from one of said electoexpansive disc members, said electroexpansive body member and then the other of said electroexpansive disc members to cause relative motion of said electromotive member and said hollow container.

20. The electromotive actuator as claimed in claim 19 wherein said means for amplifying the radial expansion of said electroexpansive disc comprises means defining a cup adapted to enclose said electroexpansive discs, said cup comprising means defining a plurality of slots disposed proximate the peripheral side of said cup, said slots defining fingers extending outwardly to engage said internal wall of said container when said electroexpansive disc member is not excited and which are retracted when said electroexpansive disc member is excited.

21. The electromotive actuator as claimed in claim 20 wherein said cup member further comprises a groove formed proximate the outside periphery of said cup proximate the base of said fingers, said groove defining a region of greater flexure of said finger whereby the radial motion of said electroexpansive disc is amplified by said fingers.

* * * * *